April 7, 1931. J. A. DIRSCHAUER ET AL 1,799,738
AUTOMATIC AUXILIARY GAUGE FOR RIP SAWS
Filed Jan. 6, 1930
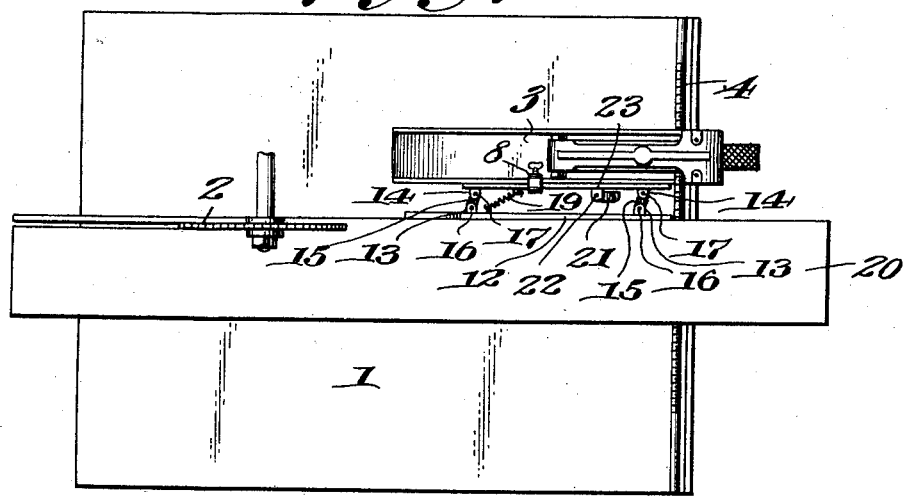
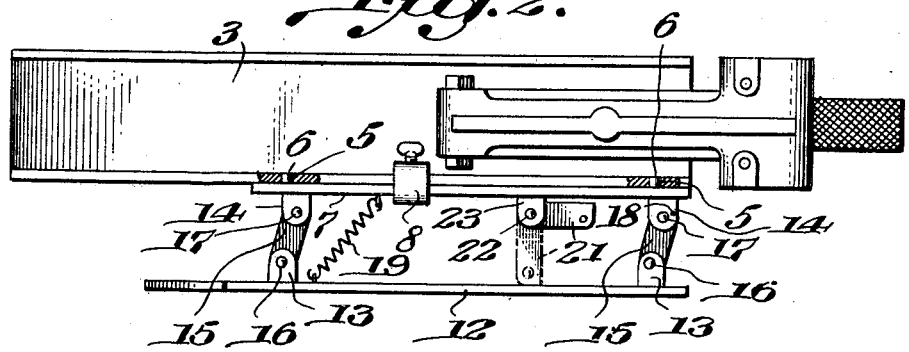
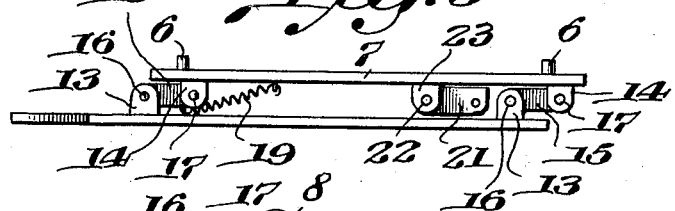

Patented Apr. 7, 1931

1,799,738

UNITED STATES PATENT OFFICE

JACOB AUGUST DIRSCHAUER AND FRANK HENRY SCHIERHOLZER, OF EVANSVILLE, INDIANA

AUTOMATIC AUXILIARY GAUGE FOR RIP SAWS

Application filed January 6, 1930. Serial No. 418,841.

The ordinary table for a circular rip saw is provided with a main gauge which is adjustable to different positions to determine the depths or widths of strips or boards which are to be sawed from the main board, a graduated scale being provided on the table so that the sawyer can set his gauge according to requirements.

However, a certain percentage of boards from which strips are to be ripped, are either hollow or crooked on the gauge-edge thereof and with such boards, the main gauge does not satisfactorily function.

The object of the present invention is to provide an improved automatic auxiliary straight line gauge adapted for attachment to the main gauge of the saw table of a rip saw, which will automatically yield and compensate for hollow or crooked edges on boards being sawed and will, when boards having proper edges are being sawed, exert a light pressure thereon, whereby proper gauging will be effected to meet all conditions encountered.

A further object is to provide an improved automatic auxiliary gauge which, when a small job of work is to be handled, may be locked so as to be fixed and unyielding and whereby, when the small job has been completed, the gauge may be unlocked so that it will be adapted to automatically yield and to exert a light pressure on the edge of the board while in use.

A practical embodiment of the invention is hereinafter described and is disclosed in the accompanying drawings, in which:

Figure 1 is a plan view showing the invention applied to a main gauge, which latter is carried by the table of a circular rip saw.

Fig. 2 is a detail view of the main gauge and the present invention.

Fig. 3 is a detail plan view of the invention by itself, in folded or retracted position.

Fig. 4 is a detail cross-section, showing the clamp.

The saw table is shown at 1, the usual circular rip saw appears at 2 and the main gauge is shown at 3, the latter being adjustable on top of the table 1 and may be set as desired, and locked in position, by positioning it in reference to the scale or vernier 4.

The main gauge 3 is of the usual construction having a trough-shaped body to accommodate our improved automatic auxiliary gauge, one of the side walls being provided with holes 5 to accommodate dowels 6 carried by the back-plate 7 of the auxiliary gauge, such back-plate lying flatwise against the side of the main gauge and being detachably secured thereto in any desired manner as, for instance, by an inverted U-shaped clamp 8 which has a projection or pin 9 on one of its legs and carries a clamping screw 10 on its other leg, the tips of the projection 9 and of the screw 10 being adapted to enter depressions 11 in the back-plate 7 and side of the gauge 3. Thus, the auxiliary gauge is securely, and detachably, fastened to the main gauge.

The auxiliary gauge has a gauge plate 12 provided with clevises 13, and the back plate is provided with clevises 14, links 15 having their ends received in the respective clevises 13, 14 and pivoted thereto at 16, 17.

To prevent the gauge plate 12 from being pressed back too far toward the back-plate 7, there is provided a pin or stud 18, or any other suitable limiting stop, on one of the clevises 14 which, by its engagement with the link 15, effects the said result.

A coil spring 19 attached to the plates 7 and 12, tends to keep the gauge plate 15 projected so that it will automatically bear against the edge of the plank or board being sawed but said spring will permit the gauge plate 12 to move backwardly toward the backplate 7 when the edge of the board 20 has a projecting part, the spring 19 holding the gauge plate 12 against the edge of the board even though hollow parts are encountered in the edge of said board.

It will be seen, from the construction described, that the auxiliary gauge acts on the "parallel-rule" principle, subject to contraction and expansion, and that the gauge plate 12 is automatically projected by the spring 19 to hold said plate in engagement with the edge of the board 20 subject, however, to permitting movement of the gauge 12 toward the plate 7.

Inasmuch as small jobs are sometimes handled and it is not necessary to provide the automatic expanding and contracting action inhering in the gauge plate 12, there is provided a locking device for holding the gauge plate 12 in extended, fixed, relationship to the back-plate 7. One such locking device is illustrated, comprising a small arm 21 pivoted at 22 to a clevis 23, the latter being carried by the back-plate 7. The end of the arm 21 may be flattened or "squared" to serve as an abutment for the gauge 12. When the small job is finished, the lock 21 is folded back so that it will not interfere with the automatic action of the gauge plate 12.

What we claim is:

1. The combination with a main gauge for the table of a rip saw, of a detachable automatically shiftable auxiliary gauge carried by said main gauge and disposed between said main gauge and the board to be sawed and being adapted to engage and follow the edge of the said board.

2. The combination with a main gauge for the table of a rip saw, of a detachable automatically shiftable, retractible auxiliary gauge carried by said main gauge and disposed between said main gauge and the board being sawed and being adapted to engage and follow the edge of the said board, and means for locking said auxiliary gauge in extended position.

3. The combination with the main gauge of the table of a rip saw, of a detachable auxiliary gauge disposed between the main gauge and the board being sawed comprising means for the attachment of the auxiliary gauge to the main gauge, and a spring operated gauge member automatically projectible from the gauging face of the main gauge or retractible toward said main gauge.

4. The combination with the main gauge of the table of a rip saw, of an auxiliary gauge comprising a plate adapted to lie against the main gauge, means for the attachment of said plate to the main gauge, a gauge plate, and joints connecting the gauge plate to the attaching plate and mounting said gauge plate between the main gauge and the board being sawed so that it may move in "parallel rule" relationship to the main gauge.

5. The combination with the main gauge of the table of a rip saw, of an auxiliary gauge comprising a plate adapted to lie against the main gauge, means for the attachment of said plate to the main gauge, a gauge plate, joints connecting the gauge plate to the attaching plate and mounting said gauge plate between the main gauge and the board being sawed so that it may move in "parallel rule" relationship to the main gauge, and spring means co-operating with the gauge plate, adapting it to automatically yield or advance in relation to the attaching plate according to the condition of the edge of the board being sawed.

6. The combination with the main gauge of the table of a rip saw, of an auxiliary gauge comprising a plate adapted to lie against the main gauge, means for the attachment of said plate to the main gauge, a gauge plate, joints connecting the gauge plate to the attaching plate and mounting said gauge plate between the main gauge and the board being sawed so that it may move in "parallel rule" relationship to the main gauge, spring means co-operating with the gauge plate, adapting it to automatically yield or advance in relation to the attaching plate according to the condition of the edge of the board being sawed, and means co-operating with the attaching plate and the gauge plate for locking the gauge plate to prevent it from yielding.

7. An auxiliary gauge for use in connection with the main gauge of the table of a saw, comprising a back-plate having means for its attachment to the main gauge, a gauge plate, connections between said plates whereby the gauge plate may yield toward, or advance from, the back-plate in parallel relationship thereto, and spring means for automatically moving said gauge plate in a yielding manner away from the back plate.

8. An auxiliary gauge for use in connection with the main gauge of the table of a saw, comprising a back-plate having means for its attachment to the main gauge, a gauge plate, connections between said plates whereby the gauge plate may yield toward, or advance from, the back-plate in parallel relationship thereto, spring means for automatically moving said gauge plate in a yielding manner away from the back plate, and a lock for holding said gauge plate in advanced position against the pressure exerted thereon by the board being sawed.

9. The combination with the table of a rip saw, of a main gauge adjustable toward and away from said saw, and automatically yielding and advancing straight-edge auxiliary gauge carried by the main gauge adapted to co-operate with the edge of a board being sawed.

In testimony whereof we affix our signatures.

JACOB AUGUST DIRSCHAUER.
FRANK HENRY SCHIERHOLZER.